Patented Mar. 25, 1930

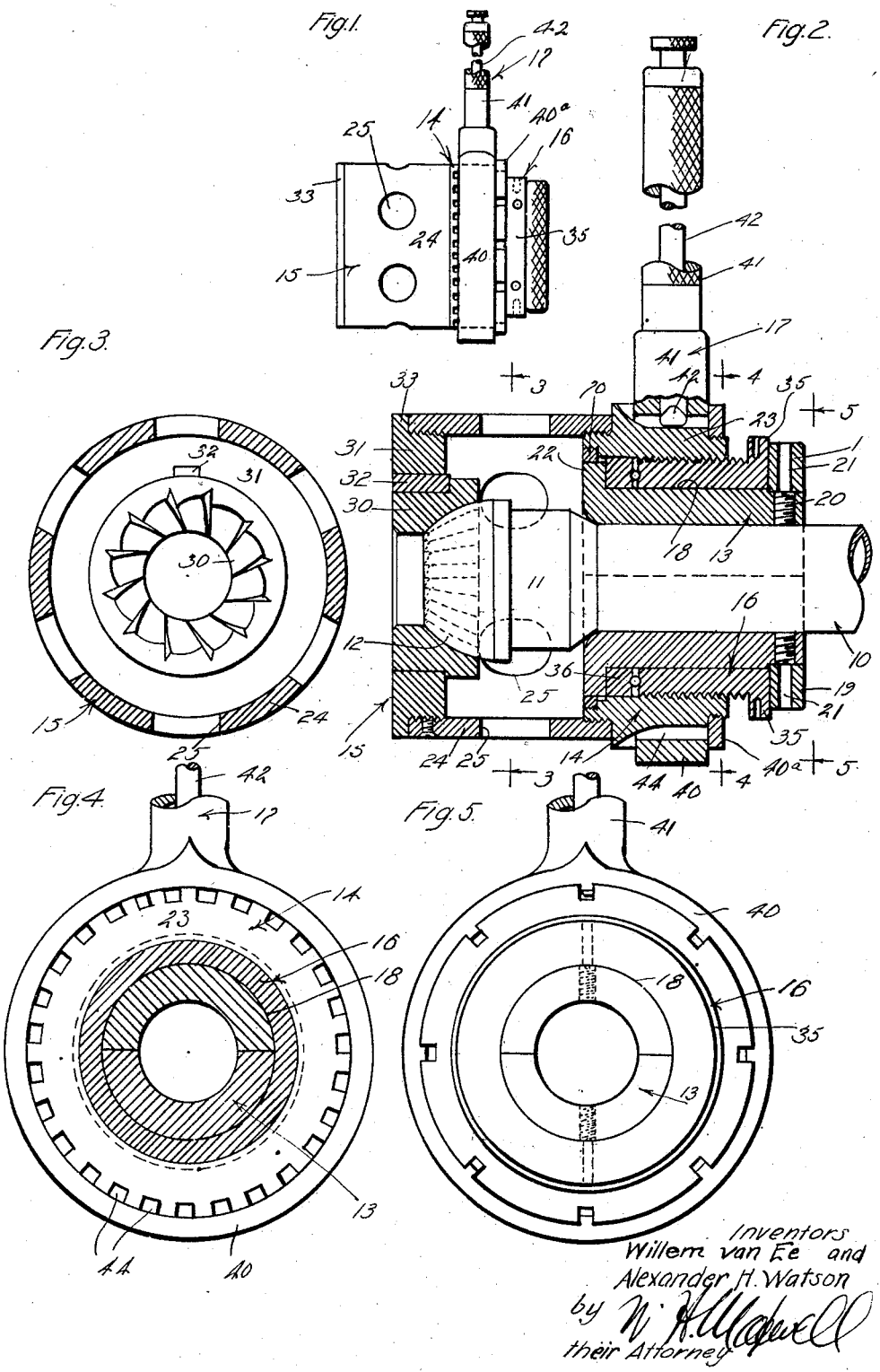

1,751,776

UNITED STATES PATENT OFFICE

WILLEM VAN EE, OF LONG BEACH, AND ALEXANDER HENDREN WATSON, OF REDONDO BEACH, CALIFORNIA

TUBE-FACING TOOL

Application filed September 29, 1927. Serial No. 222,780.

This invention has to do with a tool for facing the ends of tubes, or the like, and it is a general object of the invention to provide a practical and effective portable tool of this character.

Our invention is useful, generally, for dressing or facing the ends of tubes, rods and other like parts. The invention is, however, particularly suited to use in facing boiler or superheater tubes provided with enlarged ends spherically curved to seat in correspondingly shaped sockets or recesses in plates or drums. In the case of a commonly used type of steam superheater, the ends of the superheater tubes are enlarged and provided with spherically curved faces to seat in correspondingly curved recesses in the wall of the drum. These connections depend for tightness upon a perfect fit between the faces of the tubes and the recesses in the drum. The general arrangement and construction of parts is such that it is difficult and very inconvenient to remove the tubes and, therefore, it has heretofore been expensive and difficult to make repairs on the joints between the tubes and the drums.

It is a general object of this invention to provide a portable tool that can be conveniently and effectively used in a boiler or superheater to face or refinish tubes such as are mentioned above.

Another object of this invention is to provide a tool of the character mentioned which can be easily and quickly applied to the end of a tube having an enlarged faced portion.

A further object of this invention is to provide a tool of the character mentioned in which the moving or operating parts are mounted so that they operate with a minimum amount of friction.

The various objects and features of the invention will be fully understood from the following detailed description of a typical form and application of the invention throughout which description we refer to the accompanying drawings in which Fig. 1 is a side elevation of the tool provided by the invention;

Fig. 2 is an enlarged longitudinal detailed sectional view of the tool showing it in operating position on the end of the tube;

Fig. 3 is a transverse sectional view of the tool being a view taken as indicated by line 3—3 on Fig. 2;

Fig. 4 is a detailed transverse sectional view taken as indicated by line 4—4 on Fig. 2; and Fig. 5 is an end view of the tool taken as indicated by line 5—5 on Fig. 2.

For purpose of example, we will refer to our invention as applied to a boiler or superheater tube 10 having an enlarged end 11 with its outer face 12 dressed or finished so that it is spherically curved or otherwise shaped to seat in a correspondingly shaped socket or recess in a plate or drum. We are making particular mention of this form of tube as it will facilitate a clear understanding of the invention. However, we do not wish the broader principles of the invention to be understood as limited to any such specific application.

The tool provided by our invention includes, generally, a mounting bushing 13 to be applied to the tube 10 adjacent the enlargement or head 11, a body 14 to be mounted on the bushing, a cutter head 15 carried by the body to engage the face 12 of the head of the tube, a feed nut 16 operable to move the body so that the cutter head is fed into engagement with the tube, and manual operating means 17 for rotating the body so that the cutter head is rotated to cut or dress the end of the tube.

The mounting bushing 13 is adapted to fit over the tube 10 adjacent the head 11 and is finished so that its inside diameter is just sufficiently large to receive the tube. The exterior of the bushing is finished to present a bearing face 18, the diameter of which is slightly larger than the largest diameter of the head 11.

In accordance with our invention, the bushing 13 is split longitudinally to facilitate its being applied to or assembled around the tube 10. A locking ring 19 is provided in connection with the ring to be passed over the head 11 of the tube and be set on the bushing to retain or lock the bushing sections in the assembled position shown throughout the drawings. Any suitable means may be provided for setting the bushing sections with reference to the ring, for instance, each bushing section may be provided with an opening to carry a set screw 20 and the ring may be provided with openings 21 to register with the set screws so that the set screws can be operated to engage the tube. In the particular form of the invention illustrated in the drawings, the bushing 13 is provided adjacent the head 11 of the tube with an outwardly extending flange 22 and, in this case, the ring 19 is applied to the opposite end of the bushing.

The body of the tool is adapted to be rotatably supported from the bushing 13 so that it carries the cutter head at the face 12 of the tube head 11 and so that it can be moved longitudinally to feed the cutter head against the face 12. The body 14 may vary in design and construction. In the drawings, we have shown the body in the form of an annular member 23 internally threaded to receive the feed nut. The body carries the manual operating means 17. The feed nut 16 which threads into the body is rotatively mounted on the bearing bushing 13 and, therefore, rotatably supports the body on the bushing.

The cutter head 15 may include a suitably designed milling cutter 30, a head 31 carrying the cutter, and a cage 24 mounting the head on the body. The head 31 is in the form of an annular member in which the milling cutter is inserted and locked by a suitable key 32. The head is screw threaded to the cage 24 which in turn is screw threaded to the body 14. The head 31 is provided with a flange 33 to seat against the outer end of the cage 24. The cage 24 is provided with openings 25 to allow the escape of cuttings and is threaded to the body so that its inner end seats against the shoulder on the body.

The feed nut 16 is rotatably carried on the bearing face 18 of the bushing 13 between the flange 22 and the locking ring 19 and screw threads into the body 14. The nut is provided adjacent the locking ring 19 with a flange projection 35 adapted to be engaged by a suitable operating tool, for instance, a spanner wrench or the like. A thrust bearing, preferably an anti-friction bearing 36, is arranged between the feed nut and the flange 22 of the bushing. A retaining ring 70 may be threaded into the body from its outer end to hold the bearing in the body so that the body, feed nut, thrust bearing and operating means form a single unit of the tool.

The manual operating means 17 provided for rotating the body 14 includes a sleeve 40 rotatably mounted on the section 23 of the body, a handle 41 projecting from the sleeve and a pawl 42 carried by the handle to cooperate with the notches or detents 44 provided in the exterior of the section 23. The pawl 42 may be spring pressed to normally extend into the detents and may have its inner end dressed to ratchet over the detents in one direction. The outer end of the pawl 42 projects from the outer end of the handle 41 so that the pawl can be withdrawn or released from the detents allowing the operating means to rotate free of the body. The sleeve 40 may be held in operating position on the body 14 by a retaining nut 40a.

In using the tool, the locking ring 19 is first slid on to the tube over the head 11 followed by the unit comprising the body 14, thrust bearing 36, feed nut 16 and operating means 17. The parts or sections of the mounting bushing 13 are then assembled on the tube and slid into the feed nut so that they project from the outer end of the feed nut to receive the locking ring 19. The parts are then positioned so that the bushing engages the head 11, whereupon the screws 20 are actuated to lock the bushing in place ready for operation. The cutter head is then applied to the body by screwing the cage on to the end of the body, completing the assembly of the tool and making the tool ready for operation. To dress or finish the face 12 of the head 11, the body is rotated in the desired direction through manipulation of the handle 41 of the operating means. The cutter head, being mounted on the body, is carried around or rotated with the body so that the cutter 30 cuts or dresses the face 12 of the tube. The cutter 30 is fed into proper cutting engagement with the face 12 through manipulation of the feed nut 16. It will be obvious that rotation of the feed nut in a manner to screw it into the body 14 causes the body 14 to draw the cutter head against the end of the tube so that the cutter 30 is fed against the face 12.

Having described only a typical preferred form of our invention, we do not wish to limit ourselves to the specific details set forth, but wish to reserve to ourselves any changes or variations that may appear to those skilled in the art or fall within the scope of the following claims.

Having described our invention, we claim:

1. A device for dressing the end of a tube including a split bushing to be applied to the tube and having a shoulder, a feed member rotatably carried on the bushing opposite the shoulder, a body threaded to the feed member, a cutter head carried by the body, and means for rotating the body.

2. A device for dressing the end of a tube including a split bushing to be applied to the tube and having a shoulder, a locking ring for the bushing, a feed member rotatably carried on the bushing opposite the shoulder, a body threaded to the feed member, a cutter head carried by the body, and means for rotating the body.

3. A device for dressing the end of a tube including a split bushing to be applied to the tube and having a shoulder, a feed member rotatably carried on the bushing opposite the shoulder, an anti-friction bearing arranged between the shoulder and said member, a body threaded to the feed member, a cutter head carried by the body, and means for rotating the body.

4. A device for dressing the end of a tube including a split bushing to be applied to the tube and having a shoulder, a feed member rotatably carried on the bushing opposite the shoulder, a body threaded to the feed member, a cutter head carried by the body, and ratchet operating means for rotating the body.

5. A device for dressing the end of a tube including a split bushing to be applied to the tube and having a shoulder, a feed member rotatably carried on the bushing opposite the shoulder, a body threaded to the feed member, a cutter head carried by the body, and ratchet operating means for rotating the body, said means including a ring rotatably carried on the body, a handle projecting from the ring, and a pawl carried by the handle to cooperate with notches in the body.

6. A device for dressing the end of a tube including a split bushing to be applied to the tube and having a shoulder, a locking ring for the bushing, set screws carried by the bushing sections to be set against the interior of the ring, a feed member rotatably carried on the bushing opposite the shoulder, a body threaded to the feed member, a cutter head carried by the body, and means for rotating the body.

7. A device for dressing the end of a tube including a split bushing to be applied to the tube and having a shoulder at one end, a locking ring to be applied to the other end of the bushing, a feed nut rotatably carried on the bushing between the shoulder and ring, an anti-friction bearing arranged between the nut and shoulder, a body screwthreaded on the nut, ratchet operating means for rotating the body, and a cutter head carried by the body.

In witness that we claim the foregoing we have hereunto subscribed our names this 6th day of September, 1927.

WILLEM van EE.
ALEXANDER HENDREN WATSON.